May 11, 1926.
R. L. CARTER
PORTABLE ROUTING AND PROFILING MACHINE
Filed Dec. 5, 1924
2 Sheets-Sheet 1
1,584,078
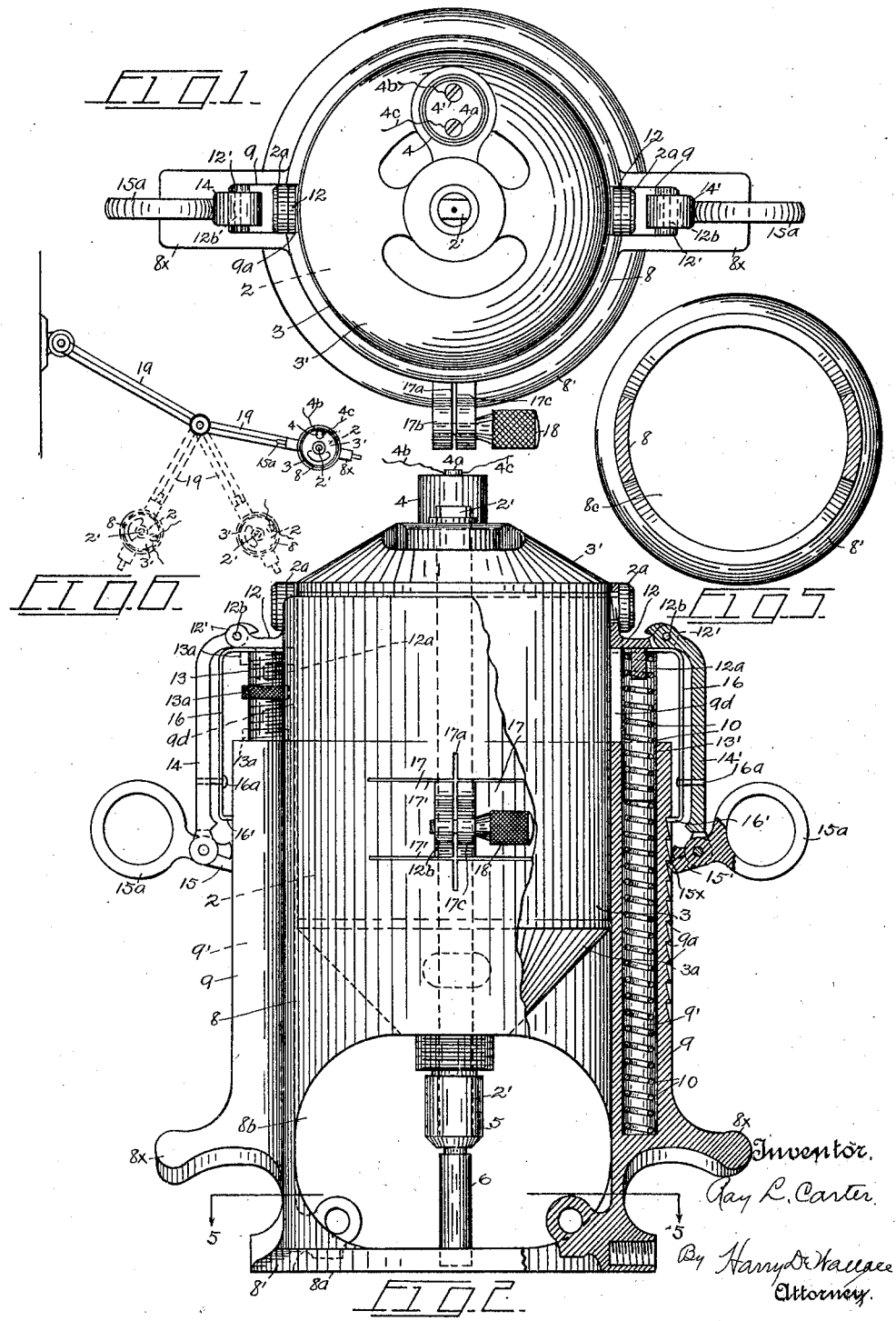

May 11, 1926.
R. L. CARTER
1,584,078
PORTABLE ROUTING AND PROFILING MACHINE
Filed Dec. 5, 1924    2 Sheets-Sheet 2
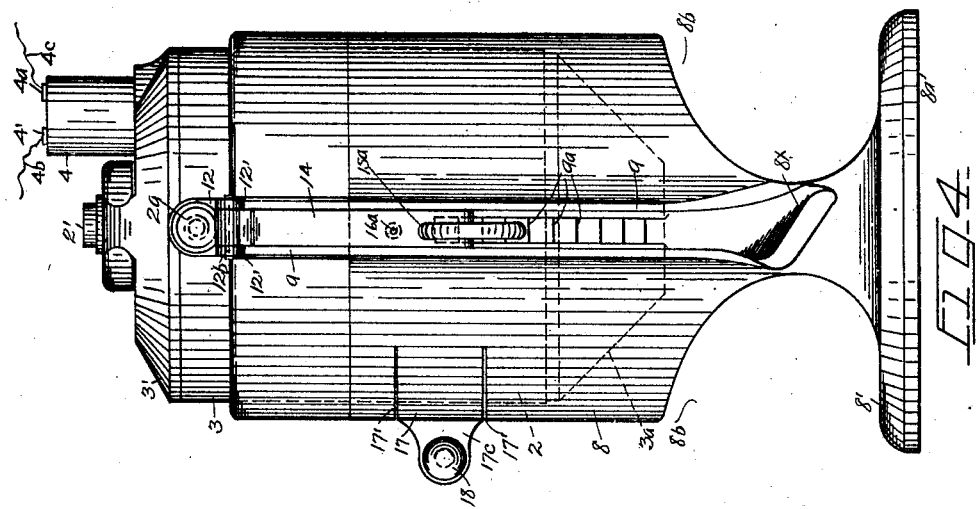
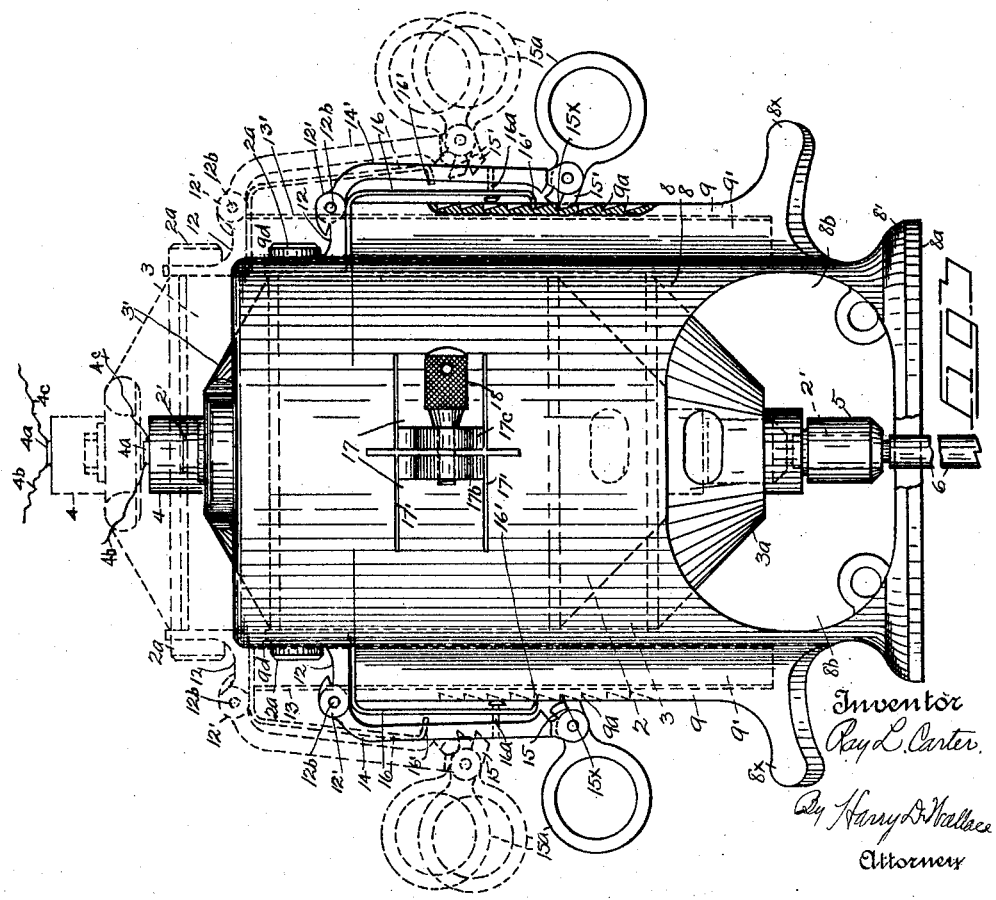

Patented May 11, 1926.

1,584,078

UNITED STATES PATENT OFFICE.

RAY L. CARTER, OF SYRACUSE, NEW YORK.

PORTABLE ROUTING AND PROFILING MACHINE.

Application filed December 5, 1924. Serial No. 754,090.

This invention relates to improvements in routers, and has for its object to provide a light portable motor-driven device of the class, adapted for routing, shaping or profiling, either wood or metal work. A further object is to provide a relatively small high-speed electric motor, for directly actuating the cutting tools; the said motor being enclosed in an insulated casing. A further object is to provide a cylindrical support for the working parts, whereby the motor, and tool driven thereby, may be adjusted axially relative to the plane of the work. A further object is to provide novel and simple means for manually lowering the motor and tool step-by-step, for varying the depth of the routing or profiling, and for temporarily locking the motor in the different adjusted positions. A further object is to provide means for rigidly clamping parts of the support to the motor casing for preventing accidental shifting of the motor and tool. A further object is to provide tension means for automaticaly withdrawing the tool from the work and for restoring the motor and related parts to their normal inoperative position. And a further object is to provide an adjustable stop-gage for pre-determining the depth of the routing and other work.

This invention relates particularly to improvements in the routing and profiling devices, shown and described in my United States Patent No. 1,514,894, dated November 11, 1924.

The various features and parts of the invention will be understood from the detailed description which follows, and by reference to the accompanying drawings, in which—

Figure 1 is a top plan view of the complete machine. Fig. 2 is a partial front side elevation and partial central vertical section, showing the motor and tool in the released positions. Fig. 3 is a front side elevation in which the full lines show the motor and tool lowered for effecting a relatively deep cut; the dotted lines showing the motor and tool in full release position. Fig. 4. is a right side elevation of the machine shown in Fig. 2. Fig. 5 is a horizontal section taken on line 5—5 of Fig. 2. Fig. 6 is a reduced top plan view, showing the router supported by an extensible bracket.

In the drawings, 2 represents a high-speed electric motor, having an armature shaft 2', which projects beyond the opposite ends of a rubber or other insulated casing 3. The opposite ends of the casing are closed by similar conical caps 3'—3ª. The cap 3' is provided with an insulated plug-portion 4, in which are disposed the contacts or terminals, 4'—4ª, of the motor circuit. The motor is usually supplied with current by wires 4ᵇ—4ᶜ, which may connect the said terminals with any ordinary electric lamp socket. The cap 3ª supports the lower end of the shaft 2', the latter preferably extending below said shaft and supporting a chuck 5, in which the shank of the routing or profiling tool as 6, is inserted.

For routing or other precise work, where the device requires steadying and guiding for effecting cuttings of uniform depth, and for tracing and cutting intricate or fancy, as well as plain outlines, the motor 2 and its casing are mounted in a hollow substantially cylindrical support, as 8, which is provided with a relatively broad circular base 8', the latter having a plane bottom 8ª, which engages and may be moved over a flat surface of the work, during the routing operations. The lower front and rear sides of the support are cut away, as at 8ᵇ, and the central portion of the base is formed with a relatively large clear opening 8ᶜ (see Fig. 5), for affording access to the tools and their holders, as well as for facilitating the "spotting" and observation for the performances of the tools, and the escape of the chips and dust resulting from the work. The body of the support 8 is hollow throughout, the bore thereof preferably being smooth, and being a few thousandths of an inch larger than the diameter of the motor casing 3, so that the latter may be reciprocated axially within the support, without danger of wobbling or chattering while the work is being done (see Figs. 2 and 3). The opposite lateral sides of the support 8 are formed with longitudinal ribs 9, the said ribs being bored out for providing relatively deep sockets 9', for housing coil cushion springs 10, of sufficient strength to normally support the weight of the motor and related parts, in the released position, shown in Fig. 2. The outer faces of the ribs 9 are provided with ratchet teeth 9ª, the said teeth preferably being sunk into the faces of the ribs, as shown in Figs. 2, 3 and 4. The tops of the ribs 9 are spaced an inch or more below the top end of the support 8, and the corresponding walls of the support are formed with longitudinal slots 9ᵈ, which register with the ribs and the sockets 9', as shown in Figs. 1, 2 and 4. 12 represents similar L-shaped brackets, which are mounted upon the opposite top sides of the motor casing 3, by the usual thumb-screws 2ª, which support the commutator brushes of the motor (not shown). The vertical arms of the brackets 12 are slidably disposed in and guided by the slots 9ᵈ, which not only limit the longitudinal movement or play of the motor in the support 8 but also prevent the rotation of the motor casing. The horizontal arms of the brackets 12 which extend across the top of the ribs 9, are provided with spaced perforated hinge-loops 12', and from their bottom faces depend studs 12ª, which are disposed in the top ends of the springs 10, for holding the latter in place. 13—13' represent similar cylindrical caps, which enclose and support the top end-portions of the springs 10, the lower ends of said caps being slidably disposed in the sockets 9'. The cap 13 is preferably externally threaded, and is fitted with a stop comprising a nut 13ª, by means of which the longitudinal movements of the motor may be gaged, for predetermining the depth of the routing by the tool 6. 14—14' represent similar curved links, whose top ends are pivoted to the horizontal arms of the brackets 12, by pins 12ᵇ. These links extend downwardly in registry with the ribs 9 and the racks 9ª, and to their lower ends are pivoted similar pawls 15—15', which are normally in engagement with the teeth 9ª, as shown in Fig. 2, and by the full lines in Fig. 3. The vertical rocking of the pawls on pivots 14ª exerts the required leverage, for lowering the motor and tool 6 against the tension of the springs 10, as from the position shown in Fig. 2, to the full line position shown in Fig. 3, for effecting the routing or other work. The pawls 15 are provided with relatively large loops 15ª, by which they are manipulated. To do this, the operator inserts the fore-finger of each hand through the corresponding loop, then places his thumbs beneath similar stationary lugs 8ˣ, which extend radially from the lower end-portion of the support 8, in line with the ribs 9 and the loops 15ª (see Figs. 2, 3 and 4). The downward pressure or movement of the fingers rotates the pawls on the fulcrums or axes 15ˣ, and correspondingly depresses the motor and tool 6 towards the routing position, as shown in Fig. 3. By this construction and arrangement of the parts, the motor may be lowered axially step-by-step, until the tool 6 projects the desired distance below the plane-bottom 8ª of the base. The motor and tool are temporarily held in the various adjusted (depressed) positions effected by the downward movement of the pawls, by means of spring detents 16, which depend between the ribs and the links (see Figs. 2 and 3). The top ends of the detents are bent inwardly at right angles and perforated, and these portions are disposed between the brackets 12 and the tops of the caps 13, and are held in place by the studs 12ª, which pass through the perforations, as shown in Fig. 2. The lower ends of the springs 16 are formed with inwardly facing hooks or teeth 16', which engage the ratchet teeth 9ª above the pawls, as shown in Figs. 2 and 3, for temporarily holding the motor and related parts in the adjusted or working positions. After the adjustment of the motor and tool is effected, as described, the motor is held rigid in the barrel 8, by simple clamping means comprising similar slightly flexible tongues 17, which are formed by slitting one side of the barrel of the support horizontally, as at 17', and also by a vertical slit 17ª, as shown in Figs. 2, 3 and 4. The free or facing ends of the tongues 17' are formed with integral perforated lugs 17ᵇ—17ᶜ, through which a clamping screw 18 passes; the lug 17ᵇ being threaded for rendering the clamping effective, in a well-known manner. The teeth 9ª are usually about a quarter of an inch in length, and each operation of the pawls step or move the motor and tool axially the extent of one tooth. This allows the detents 16 to correspondingly snap into new teeth, for preventing the automatic release of the motor, by the recoil of the springs 10, until the desired adjustment of the tool is effected, and the clamping screw 18 is finally tightened up.

After the routing or profiling work is completed, the screw 18 is loosened, and the operator again grasps the loops 15ª and swings the pawls and links outwardly away from the ribs, as shown by the dotted lines in Fig. 3. This frees the pawls and detents from the racks 9ª, and allows the springs 10 to expand, for lifting the motor and tool to the idle or released position, shown in Fig. 2, and by the dotted lines in Fig. 3. After the tool 6 is withdrawn from the work, as explained, the screw 18 may again be tightened up, for holding the parts rigid until the next routing operation. The springs 10 are preferably of sufficient strength to readily lift and hold the motor in the released position. The detents 16 are preferably made of spring metal, and their tension is normally exerted for holding their lower free ends against the teeth of the racks. The detents are prevented from movements laterally, but are allowed a limited movement relatively to the ribs and links, by means of guide-pins 16ª, which pass loosely through perforations in the detents; the said pins being rigid to the links, as shown in Fig. 2.

For extremely light, intricate, or ornamental routing, wherein relatively small machines are employed, the latter are preferably mounted upon an extensible universally operable bracket, as 19, shown in Fig. 6. As the bracket 19 supports the entire weight of the motor the operator need only concern himself with the maneuvering, steering and adjusting of the machine.

My improved routing and profiling machine is extremely simple, and may be produced at less cost than my former router. The provision of the smooth bore of the support 8, and the corresponding smooth external surface of the motor shell 3, greatly reduces the time, labor and expense of machining these parts, and enables me to employ the pawl-and-ratchet mechanism for effecting ready and quick, as well as precise adjustments, which may be finely and accurately gaged, for predetermining the depths of the cuttings by the tools. By adopting the aforesaid novel features and parts, cavities may be cut or routed to required depths, either by a single operation, or by a series of successive cuttings to different levels, by simply depressing the motor step-by-step, by the manipulation of the pawls and links, as described. By reason of the present improvement, the various adjustments, as well as the releasing, of the routing parts may be effected without requiring shutting down of the motor or disturbing of the electric connections.

Having thus described my invention what I claim, is—

1. A portable router including a hollow support having sockets parallel to its longitudinal axis, and having slots above and aligning with said sockets, said support having ratchet racks in the common plane of said sockets, an encased motor and a tool driven thereby reciprocatable in said support, the casing of said motor slidably engaging the bore of said support and having radial brackets adapted to be moved in said slots when the motor is reciprocated, said slots cooperating with the brackets for preventing the rotation of the motor casing, cushion means disposed in said socket adapted to support the motor and tool in the released position, and means carried by said brackets and engaging said racks adapted for moving the motor and tool towards the routing position.

2. A portable router including a hollow support having lateral slots and having sockets below and aligning with said slots, and having ratchet racks in the common plane of said sockets, an encased motor reciprocatable in said support, the casing of said motor having a smooth external surface for slidably engaging the interior of said support, brackets carried by said casing slidable in said slots, cushion means protruding from said sockets normally supporting the weight of the motor and casing adapted to prevent the gravitation of the motor, and links carried by the motor casing adapted to engage said racks for depressing the motor step-by-step towards the routing position.

3. In a machine for routing and profiling, a hollow cylindrical body having a smooth interior surface and having outwardly facing hollow ribs arranged diametrically, an electric motor adapted to support and drive a routing tool supported axially in said body, springs carried by said ribs adapted to normally support said motor and tool in the released position, means for simultaneously compressing said springs and for moving said motor and tool step-by-step towards the routing position, said compressing means adapted for temporarily locking said motor against release by said springs during the adjustment of said tool, and means for swinging corresponding members of the compressing means away from the said body for effecting the movement of the motor and tool away from the work by the recoiling of said springs.

4. A portable router comprising a motor and a tool driven thereby, a casing enclosing the motor, a cylindrical support in which said casing is movable axially, racks disposed at the opposite lateral sides of said support, similar pawl-and-link mechanisms disposed at said opposite sides adapted for moving the motor and tool step-by-step towards the routing position, spring detents disposed between the racks and links adapted for temporarily holding the motor and tool in the adjusted positions, and tension devices embedded in said opposite lateral sides adapted for moving said motor and tool away from the work.

5. A router comprising a motor and a tool driven thereby, a support for the motor provided with slots for facilitating the movement of the tool axially towards and away from the routing position, pawl-and-ratchet mechanisms located at the opposite sides of said support for varying the depth of the cutting by the tool, links for pivotally supporting the pawls, and means supported by said links for locking the motor and tool at different levels relatively to the work.

In testimony whereof I affix my signature.

RAY L. CARTER.